US008988638B2

(12) United States Patent
Jiang

(10) Patent No.: US 8,988,638 B2
(45) Date of Patent: Mar. 24, 2015

(54) POLARIZING RETRO-REFLECTIVE SHEETING COMPRISING A CHOLESTERIC LIQUID CRYSTAL POLYMER FILM

(76) Inventor: Yingqiu Jiang, Sunnyvale, CA (US)

( * ) Notice: Subject to any disclaimer, the term of this patent is extended or adjusted under 35 U.S.C. 154(b) by 778 days.

(21) Appl. No.: 13/115,972

(22) Filed: May 25, 2011

(65) Prior Publication Data

US 2012/0300166 A1 Nov. 29, 2012

(51) Int. Cl.
*G02F 1/1335* (2006.01)
*G02B 5/128* (2006.01)

(52) U.S. Cl.
CPC .................................... *G02B 5/128* (2013.01)
USPC .......................................... 349/115; 349/175

(58) Field of Classification Search
USPC ......................................... 349/115, 168, 175
See application file for complete search history.

(56) References Cited

U.S. PATENT DOCUMENTS

| | | | | |
|---|---|---|---|---|
| 3,700,305 | A | 10/1972 | Bingham | |
| 3,700,478 | A | 10/1972 | Bingham | |
| 6,172,810 | B1 | 1/2001 | Fleming et al. | |
| 6,292,242 | B1 * | 9/2001 | VanderPloeg et al. | 349/118 |
| 2003/0038912 | A1 * | 2/2003 | Broer et al. | 349/122 |
| 2006/0170847 | A1 * | 8/2006 | Maeda et al. | 349/115 |
| 2008/0143949 | A1 * | 6/2008 | Ino | 349/151 |

* cited by examiner

*Primary Examiner* — Paul Lee

(57) ABSTRACT

A polarization-sensitive beaded retro-reflective sheeting having cholesteric liquid crystal material as the specular reflective coating and methods of making the same are described.

10 Claims, 3 Drawing Sheets

POLARIZING RETRO-REFLECTIVE SHEETING COMPRISING A CHOLESTERIC LIQUID CRYSTAL POLYMER FILM

BACKGROUND OF THE INVENTION

The terms: beads, microspheres or spheres are used here interchangeably to mean an approximately spherical object with a diameter from 1 micrometer to several millimeters.

Retro-reflective sheeting has been useful for various applications for decades. Typical applications include signage, such as traffic signs and marks, airport runway paints, etc., and non-signage applications, such as positioning markers, tagging-tracking-and-locating (TTL) applications. While the prismatic (corner cubes) retro-reflector provides high intensity reflection, the beaded or micro-sphere based retro-reflective sheeting remains a viable solution for many practical uses, due to its low cost, low maintenance, ease of application, and wider acceptance angle.

Beaded retro-reflective sheeting articles usually use a plurality of glass or other ceramic microspheres to reflect incidence light back in the direction from where it comes. Typically the microspheres are embedded in a substrate material, and a specular reflective coating is provided in between the microspheres and the substrate. The reflective coating can be a metallic layer, as described in U.S. Pat. No. 3,700,478 (Bingham), an inorganic dielectric coating, as described in U.S. Pat. No. 3,700,305 (Bingham), or an organic reflective coating having different refractive indices, as disclosed in U.S. Pat. No. 6,172,810 B1 (Fleming, et al).

The beaded retro-reflective sheeting can be categorized into three types: exposed lens, enclosed lens, and encapsulated lens. The exposed lens type provides the highest reflectance, but its brightness is easily reduced by foreign materials, especial by liquids such as water and dirt deposits on the exposed beads surfaces. The two enclosed types both have a protective material that is at least partially transparent to the wavelength of interest and they are above the front side of the beads: the embedded type provides good environmental protection compared to the exposed type, but has a reduced reflectance due to reduced index difference/planarization of the sheeting surface. The encapsulated type has a polymer layer covering the front side of the beads but leaves an air gap in between the cover layer and the beads. The latter configuration provides environmental protection without reducing the brightness.

All prior arts of beaded retro-reflective sheeting are polarization insensitive (incident or retro-reflected light are not polarized). For applications such as target recognition, a polarization sensitive retro-reflective article is highly desirable.

SUMMARY OF THE INVENTION

This invention is related to a beaded retro-reflective sheeting element that is polarization sensitive and the method of making the same. The key feature of the invention is the use of cholesteric liquid crystal which reflects circularly polarized light as the specular reflective material. As described herein, the invented polarizing retro-reflective sheeting comprises two key components: a cholesteric liquid crystal reflective layer, and plurality number of microspheres. In some embodiments the invented article has an overcoat or it is enclosed by adding a top shielding material. The invented polarizing retro-reflective sheeting element reflects the incoming light having the same polarization as the cholesteric liquid crystal, and is muted to light having the opposition polarization. For the encapsulated lens type the covering layer can be an optical retardation film, and as a result, the polarization of the reflected light can be modified to different polarization states.

DETAILED DESCRIPTION OF THE INVENTION

Figure 1:
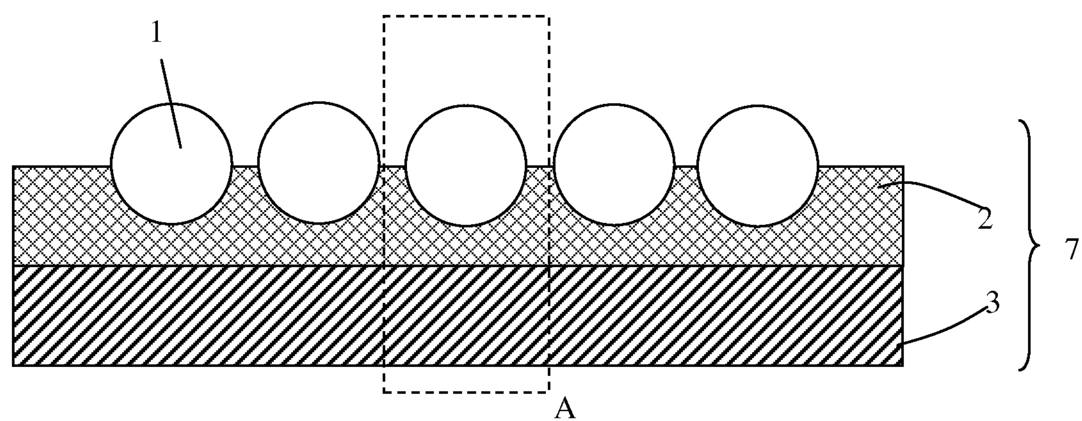
FIG. 1 shows the basic configuration of the invented beaded polarizing retro-reflective sheeting.
Figure 2:
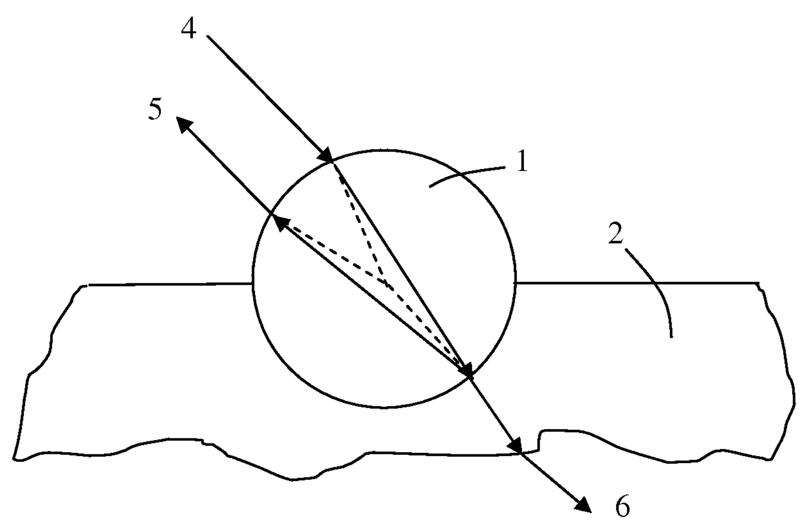
FIG. 2 is a detailed description of how light propagates through a single bead and is being reflected by the cholesteric liquid crystal medium.

Referring now to FIG. 1, the basic configuration of the invention (7) comprises a plurality of beads (1) partially submerged in a reflective layer which is cholesteric liquid crystal (2), with an optional supporting substrate (3). FIG. 2 is a magnified view of section A of FIG. 1 which illustrates unpolarized light (4) propagating through a single bead (1) partially submerged in the cholesteric liquid crystal (CLC) material (2).

When CLC molecules are arranged in a way that their helical axis is perpendicular to the surface of the CLC layer, the resulting film has a reflection band centered at some wavelength $\lambda_0$ and has a bandwidth of $\Delta\lambda$. The reflected light is circularly polarized, with the sense of polarization determined by the sense of the helical twist of the cholesteric liquid crystal material.

For an example, the cholesteric liquid crystal layer in FIG. 2 can be designed to reflect the incoming light (4) centered at $\lambda_0$=550 nm in right-handed (RH) polarization. The observer detects a RH green reflection signal (5) from the direction of incidence. The transmitted light (6) consists of left-handed (LH) light of all wavelengths and RH light of all wavelengths expect the green. The transmitted light can be absorbed if an absorptive layer (not shown) is used as the substrate for the CLC layer. The observer will then observe pure green light in the retro-reflective direction with good contrast.

Figure 3:
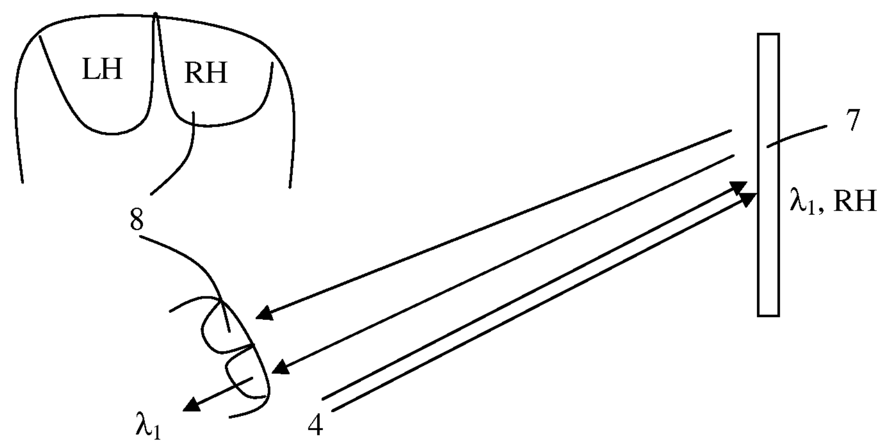
FIG. 3 illustrates the polarization selectivity of the invention. Only light in the correct polarization passes through the analyzing lens.

FIG. 3 demonstrates the polarization selectivity of the invention. Light strikes the CLC retro-reflective sheeting (7) at an angle. The reflected beam is reflected by the beaded CLC layer and directed back to the light source. As shown in FIG. 3, the CLC material is assumed to have a RH helical twist and, therefore, the reflection beam is RH polarized. The observer wearing a pair of circular polarizers (8) (LH for the left eye, and RH for the right eye) will receive light signal only in his/her right eye. The color (wavelength) of the reflected beam is determined by the helical twist (pitch) of the CLC material. If the light source is periodically switched in between RH and LH, a blinking signal in the right eye will be detected.

Figure 4:
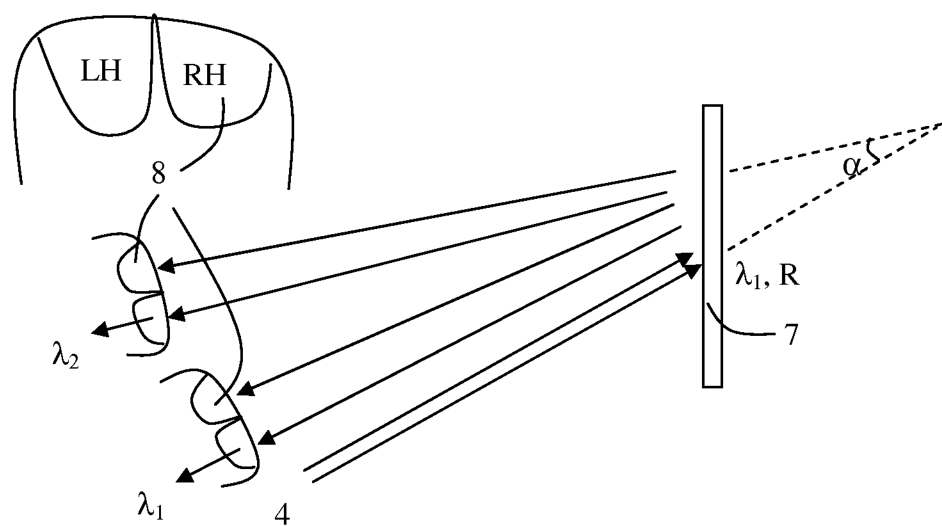
FIG. 4 demonstrates the color shift property of the invented retro-reflective sheeting. A change in color (blue shift) is observed when the viewing angle increases.

The invented polarizing retro-reflective sheeting posses color shifting effect, as a result of a blue-shift property of the CLC materials. As shown in FIG. 4, within the retro-reflection angle $\alpha$, the observer sees a gradual change of color when he/she moves away from the direction of the light source: $\lambda_1$ for $\alpha=0°$ and $\lambda_2$ ($<\lambda_1$) for $\alpha\neq0°$.

Figure 5:
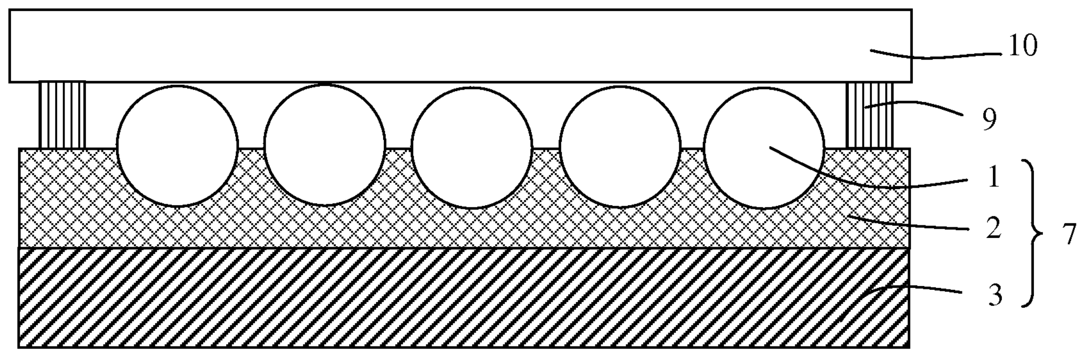
FIG. 5 shows an example of a retro-reflective sheeting that reflects linearly polarized light in an enclosed article.

In another embodiment depicted in FIG. 5, the beaded cholesteric liquid crystal retro-reflective sheeting (7) is covered by a layer of film (10) that is transparent to the wavelength of interest. Adhesive spacers (9) are used to form an enclosure of the retro-reflective element (similar to the conventional encapsulated-lens type). The cover sheet is either optically isotropic or having a uniform optical anisotropy such as $\pi/2$ retardation (quarter-wave). In most cases, the reflected bean will be linearly polarized, except when the incoming light is linearly polarized and the quarter-wave retarder is arranged to change the polarization state from linear to circular of which the handedness is exactly opposite to that of the CLC material.

Figure 6:
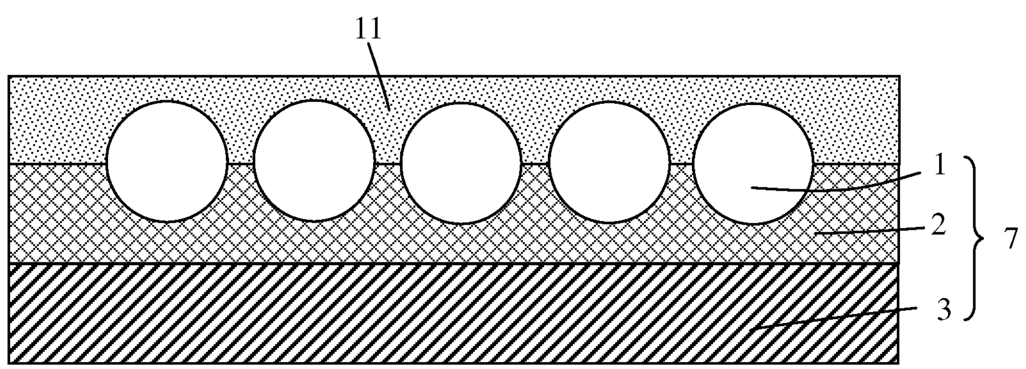
FIG. 6 illustrates an embedded CLC retro-reflective sheeting article.

Another embodiment includes the basic beaded CLC retro-reflective sheeting (7) described in FIG. 1 but with a top coating (11) to embed the beads material and to planarize the top surface of the sheeting (FIG. 6). In this case, polymer materials with index of refraction different than that of the beads material are used to "fill" the gaps in between the beads thus to form a uniform top surface to protect beads from environmental impacts.

Beaded cholesteric liquid crystal retro-reflective sheeting can be made by mixing microspheres with CLC materials. The CLC is typically a mixture of nematic liquid crystal and chiral components. Solvents can be used (not a necessary requirement) to reduce viscosity. Conventional coating or painting techniques are compatible means of application. When applied to a smooth substrate, the beads, which were pre-treated with surfactant, will surface to the top of the solution, and stay at the top of the CLC layer after evaporation of the solvent. In some cases the coating is then heat treated to induce alignment for CLC molecules. When the molecules are aligned properly (helical axis perpendicular to the substrate), the reflection from the CLC coating layer is maximized. If the CLC materials are monomers mixed with standard initiators, thermal or photo-polymerization of the coating can be used to solidify the CLC materials with the beads partially submerged.

Another way of making the beaded CLC retro-reflective sheeting is to coat a layer of CLC material mixture on a smooth substrate either with or without the presence of solvent. In some cases the coating is maintained at an elevated temperature to keep the viscosity low while obtaining good molecular alignment. Apply miscrospheres to such coating and adjust the viscosity of the coating so that the beads are partially submerged in the CLC coating to the desirable depth. Apply thermal or photo-polymerization to solidify the coating.

Another embodiment consists of pre-fabricating a polymeric CLC film, preferably on a support layer, using it as the substrate of the retro-reflecting sheet and repeating the above steps. The CLC film has the same reflection properties as the CLC material that is in contact with the beads. This method guarantees a thick enough layer of CLC material, thus providing a higher reflection.

Yet another method of making the CLC retro-reflective sheeting is as follows: a release layer serves as a substrate. Apply a layer of polymer to act as a spacer layer on top of the release layer. When the spacer layer is still tacky apply a mono-layer of beads and apply pressure to embed them into the spacer layer to a depth of one bead radius. This structure is over-coated with a flat top layer, whose index of refraction is significantly different from that of the beads (usually smaller). The release layer is then removed and the spacer layer is exposed. Coat a layer of CLC on a separate substrate (like PET); laminate the beaded assembly (of the spacer layer side) with the CLC layer. Polymerize the CLC layer by UV radiation or thermal curing.

Another embodiment is first to pre-fabricate a separate polymerized CLC film on a substrate. A pressure-sensitive adhesive layer (about 1 mil) is laminated to the CLC film. A monolayer of beads is obtained by spraying the beads to the PSA layer. Pressure is applied to embed the beads to the depth of one bead radius. The beads are then over coated with a top layer for protection. The index of refraction of the beads is significantly larger than that of the top coating.

What is claimed is:

1. A retro-reflector article comprises:

a bottom substrate; and a cholesteric liquid crystal polymer film disposed onto the bottom substrate; and a plurality of microspheres partially submerged in the cholesteric liquid crystal polymer film; and a top cover located above the plurality of microspheres, and there is an air gap in between said microspheres and the cover;

wherein said retro-reflector article causes a reflected light back to an incident direction and to become polarized.

2. A retro-reflective article of claim 1, further includes a top coating layer, where the top coating layer is in between the air and the microspheres, and is contacting and surrounding the front side the microspheres and forming a flat top for the sheeting.

3. A retro-reflector article of claim 1, where the cholesteric liquid crystal polymer film is obtained by photo polymerization process.

4. A retro-reflector article of claim 1, where the cholesteric liquid crystal polymer film has a reflection bandwidth of 15 nm to 3000 nm, and the center wavelength ranges from 300 nm to 3000 nm.

5. A retro-reflector article of claim 1, where the microspheres are made of glass, ceramic, polymers, or other optically transparent materials.

6. A retro-reflector article of claim 1, where the size of the microspheres ranges from 10 microns to 5 millimeters.

7. A retro-reflector article of claim 1, where the microspheres have an index of refraction value between 1.3 to 3.0, preferably from 1.5 to 2.0.

8. A retro-reflector article of claim 1, where the cover layer is at least partially transparent to the wavelengths of interest.

9. A retro-reflector article of claim 1, where the cover layer is an optical retardation element with a retardation value of zero or $\pi/2$.

10. A retro-reflective article of claim 2, where the top coating layer material is at least partially transparent to the wavelengths of interest, and having an index of refraction smaller than that of the microspheres'.

* * * * *